M. DUVALL.
MILK AERATOR.
APPLICATION FILED NOV. 29, 1916.

1,231,866.

Patented July 3, 1917.
2 SHEETS—SHEET 1.

Inventor
Michael Duvall

By Philip A. H. Terrell
his Attorney

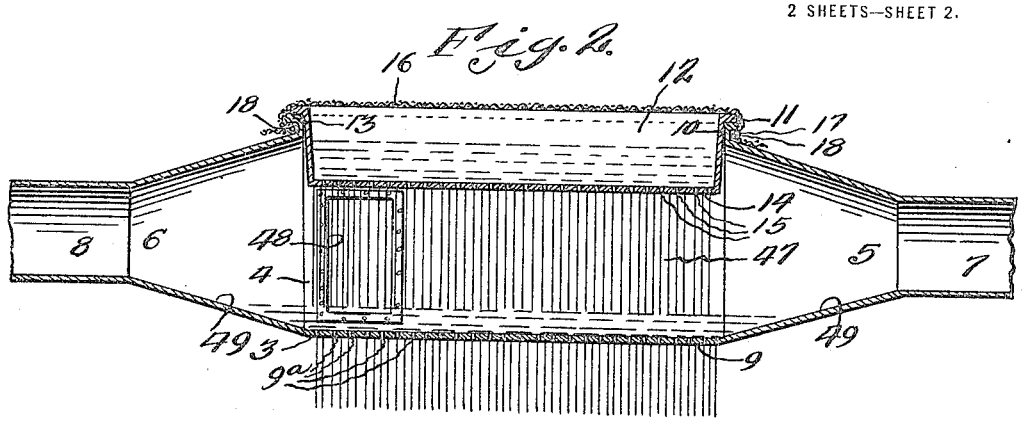
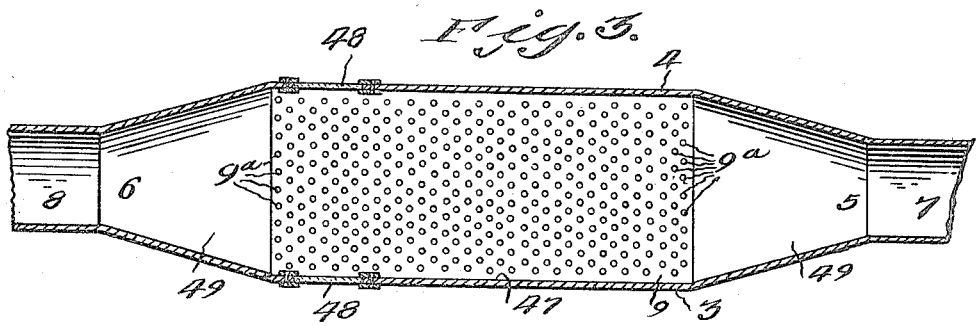
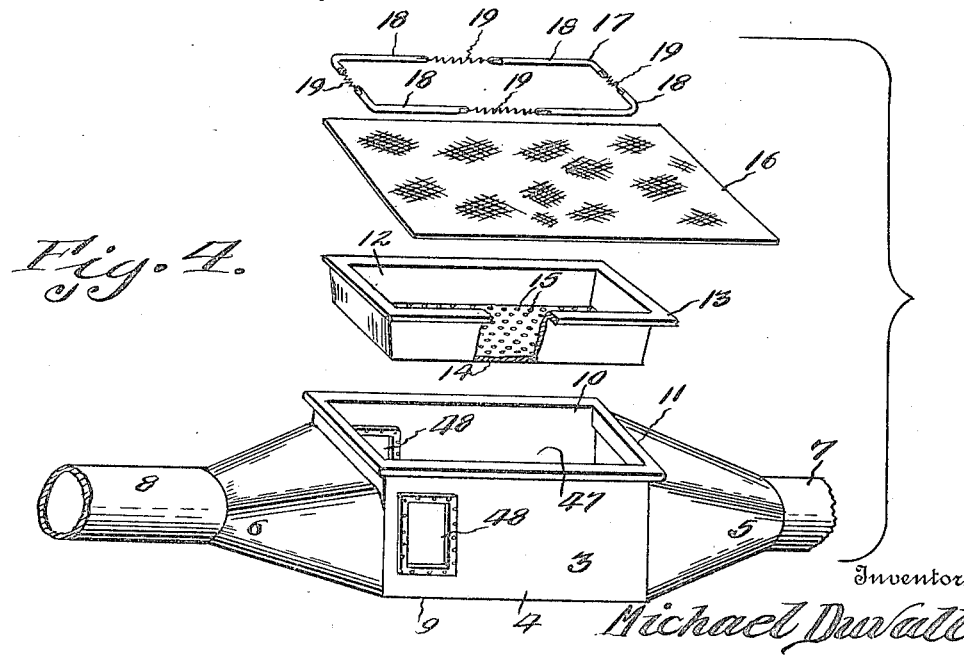

UNITED STATES PATENT OFFICE.

MICHAEL DUVALL, OF LINCOLN, WISCONSIN.

MILK-AERATOR.

1,231,866.   Specification of Letters Patent.   Patented July 3, 1917.

Application filed November 29, 1916. Serial No. 134,114.

*To all whom it may concern:*

Be it known that I, MICHAEL DUVALL, a citizen of the United States, residing at Lincoln, in the county of Wood and State of Wisconsin, have invented certain new and useful Improvements in Milk-Aerators, of which the following is a specification.

The invention relates to the art of aerating, ventilating and cooling milk.

The invention has for its object to facilitate the aeration of milk by subjecting the same to contact with a cool draft of pure air as the same is being run through a series of strainers into vats in milk depots, and cheese factories, etc. The present practice is to pour the milk into receiving or weighing receptacles and discharge it directly through a conductor-head into a common strainer, placed above the large working vats. It is the aim of the present invention to provide an aerator consisting of a series of strainers, through which the milk will be thoroughly strained, and at the same time, by the aid of a blower fan, form a suction, which will draw cool fresh air from the atmosphere, outside of the building, said air passing through the streams of milk as it is being strained, thereby ventilating, purifying and freeing the milk from all odors and animal heat. The odors and used air then being discharged outside the building.

A further object is to construct the aerator so that any milk, that may be blown out of alinement with the lower strainer, as it is strained through the intermediate strainer, will flow downwardly on to the lower strainer and thence into the vat. Also to provide blower means for controlling the suction of the air through the aerator.

A further object is to provide means whereby the air, direct from the blower, may be diverted from its usual course, and forced through the aerator and discharge the same through the intake, thereby blowing out any dirt that may become lodged in the intake pipe and also providing means for quickly and thoroughly ventilating the system.

Other objects will appear and be better understood from the embodiment of the invention of which the following is a specification, reference being had to the accompanying drawings forming part thereof, in which:

Fig. 2, is a vertical longitudinal sectional view on line 2—2 of Fig. 1.

Fig. 3, is a horizontal view on line 3—3 of Fig. 1, looking in the direction of the arrows.

Fig. 4 is a perspective collective view of the various parts of the aerator, showing them in their relative positions when the aerator is being assembled.

Figure 1:
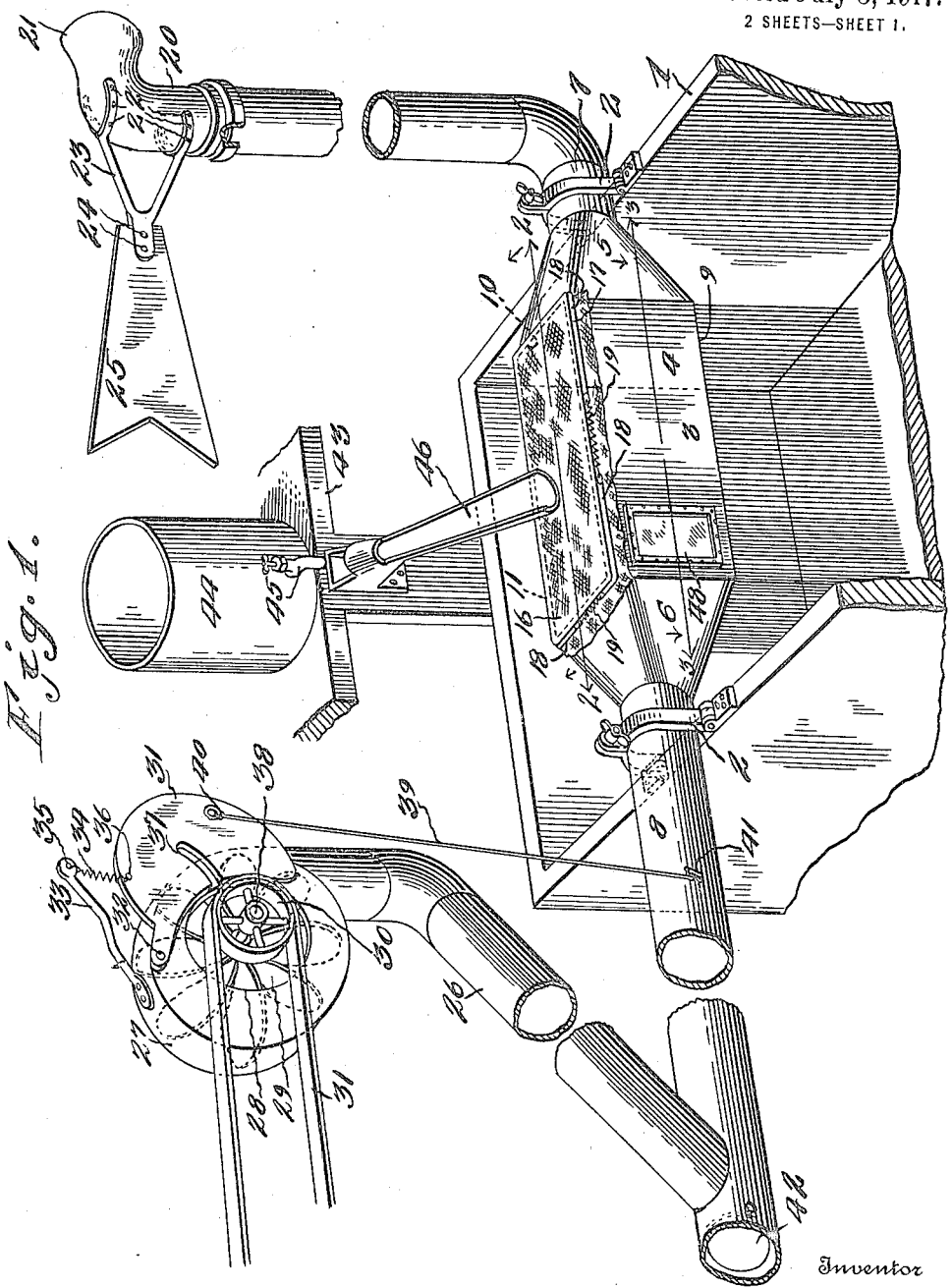
Figure 1 is a perspective view of the aerator, showing the same attached to a vat.

Referring to the drawings 1 designates a vat. To the upper edge and near the end thereof is secured, by means of brackets 2, an aerator 3. The aerator 3, comprises an elongated casing 4 square in cross section and having contracted ends 5 and 6, which terminate in intake and discharge pipes 7 and 8, these pipes 7 and 8 being in axial alinement with each other. The bottom 9 of the aerator casing is provided with a series of small apertures $9^a$, thereby forming a strainer, while the upper part of the aerator is provided with a rectangular opening 10 having a flange 11. Disposed in the rectangular opening 10 is a strainer pan 12, said strainer pan being provided with a flange 13, which rests upon the flange 11 of the aerator casing. The bottom 14 of the strainer pan is provided with a series of fine perforations 15, thereby forming an intermediate strainer. Entirely covering the top of the strainer pan 12, and surrounding the flanges 11 and 13 is a piece of cloth 16, preferably cheese cloth of one or more thicknesses, thereby forming the top strainer. The cloth is held in place by means of an expansible band 17, which comprises the four angular members 18, having their ends resiliently connected by springs 19 so that when the band is forced over the cloth covering the flanges, the band will contract and bind the cloth under the flange 11 of the aerator casing.

The intake pipe 7 extends laterally and upwardly and terminates above the building in a revoluble section 20, which terminates in a flared mouth 21 for the reception of cool fresh air at a height from the ground to assure purity. Secured to the back of the revoluble section 20, by means of rivets 22 is a rudder bracket 23, to which, by means of the rivets 24 a rudder 25 is secured. This rudder keeps the flared mouth of the section 20 pointed into the wind at all times.

The discharge pipe 8 extends outside the building, but at a point near the vat inside the building, a branch pipe 26 is provided, said branch pipe extends upwardly and rearwardly at an acute angle to the discharge pipe but in vertical alinement therewith. Carried by the upper end of the branch pipe 26 is a blower fan 27, having an intake port 28 through which air is sucked by means of the fan 29, said fan being rotated by the pulley 30, which may be belted by means of the belt 31 to any suitable source of power. The amount of air flowing through the intake port 28 of the fan casing may be regulated by means of the closure member 31, which is pivoted at 32 to the casing of the blower, there being an arm 33 secured to the casing and having a spring 34 connected thereto at 35. The other end of the spring is connected at 36 to the closure member 31. The closure is provided with a slot 37 to receive the shaft 38 when being closed by a downward pull upon the adjusting cord 39, which is secured at 40 to the closure member, while its other end is passed around a cleat 41 on the discharge pipe 8. The pipe 8 is provided with a damper 42, by the closing of which the air direct from the blower may be forced through the aerator and discharged through the intake pipe, thereby forming means whereby the intake pipe may be cleared of any dirt that may become lodged therein and the aerating chamber thoroughly aired.

Disposed above the aerator and on a stand 43, is one of the weighing-in receptacles 44, which receptacle is provided with a faucet 45, so positioned that the milk will flow through the conductor-head 46 on to the cheese cloth strainer 16, thence through the strainer 12 and into the aerating chamber 47, where it comes in contact with the fresh air. Said chamber may be inspected at any time by means of the glass observation ports 48.

The air from the blower 27 being forced into the discharge pipe 8 at an angle, will cause a suction of fresh cool air through the intake pipe 7, where it will come in contact with the fine streams of milk in the aerating chamber 47, aerating and deodorizing the same, thence passing out through the discharge pipe 8 to the atmosphere outside the building. It will be noted, that any of the milk that may be carried out of the aerator chamber 47, by the force of the air current will flow down the inclines 49 onto the strainer 9.

Having thus described my invention what I claim and desire to secure by Letters Patent is:—

1. An aerator comprising a casing forming an aerating chamber, said chamber having a perforated bottom forming a strainer, a series of detachable strainers disposed above said aerator chamber, said series of strainers being detachable, the upper strainer being of cloth while its adjacent strainer is in the form of a metal pan having a perforated bottom, its upper edge being provided with a flange adapted to engage a flange on the aerator casing, extensible resilient means around and under the flange on the aerator casing to hold the cloth strainer in place and means whereby a current of air will be sucked through the aerator intake and aerating chamber and then discharged into the atmosphere.

2. An aerator comprising a casing having contracted ends for the reception of intake and discharge pipes, said contracted parts forming means for preventing the milk from being blown or flowing into the intake and discharge pipes, a series of strainers in said casing, means for securing said casing to a vat, blower means whereby a current of air will be sucked through the aerator and damper means whereby the force of the blower may be diverted through the aerator and intake pipe to clear the same of any dirt that may become lodged therein or quickly air the system.

In testimony whereof I affix my signature in the presence of two witnesses.

MICHAEL DUVALL.

Witnesses:
 WILLIE CHRISTENSEN,
 H. CHRISTENSEN.

Copies of this patent may be obtained for five cents each, by addressing the "Commissioner of Patents, Washington, D. C."